United States Patent
Zhong et al.

(10) Patent No.: US 11,422,514 B2
(45) Date of Patent: Aug. 23, 2022

(54) WEARABLE DEVICE

(71) Applicant: Huawei Technologies Co., Ltd., Shenzhen (CN)

(72) Inventors: Lei Zhong, Shenzhen (CN); Caiwen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 16/486,733

(22) PCT Filed: Jun. 8, 2017

(86) PCT No.: PCT/CN2017/087605
§ 371 (c)(1),
(2) Date: Aug. 16, 2019

(87) PCT Pub. No.: WO2018/149060
PCT Pub. Date: Aug. 23, 2018

(65) Prior Publication Data
US 2019/0377304 A1    Dec. 12, 2019

(30) Foreign Application Priority Data
Feb. 16, 2017   (CN) .......................... 201710084524.7

(51) Int. Cl.
  *G04R 60/10*    (2013.01)
  *G04G 17/08*    (2006.01)
  *G06F 1/16*     (2006.01)
(52) U.S. Cl.
  CPC ............. *G04R 60/10* (2013.01); *G04G 17/08* (2013.01); *G06F 1/163* (2013.01)

(58) Field of Classification Search
  CPC ........ H01Q 13/10; H01Q 1/273; G04R 60/08; G04R 60/10; G04G 17/08; G04G 21/04; G06F 1/163
  USPC .......................................... 368/47
  See application file for complete search history.

(56) References Cited

U.S. PATENT DOCUMENTS

| 7,215,600 | B1  |   | 5/2007 | Derosa |
| 10,281,883 | B2 | * | 5/2019 | Szini ................ A44C 5/107 |
| 2009/0213018 | A1 | * | 8/2009 | Yang ................. H01Q 1/40 343/702 |
| 2009/0231215 | A1 |   | 9/2009 | Taura |
| 2010/0245184 | A1 |   | 9/2010 | Talty et al. |

(Continued)

FOREIGN PATENT DOCUMENTS

| CN | 101141495 A | 3/2008 |
| CN | 101521999 A | 9/2009 |

(Continued)

OTHER PUBLICATIONS

Machine Translation and Abstract of Chinese Publication No. CN101141495, Mar. 12, 2008, 8 pages.

(Continued)

*Primary Examiner* — Edwin A. Leon
(74) *Attorney, Agent, or Firm* — Conley Rose, P.C.

(57) ABSTRACT

A wearable device that includes a nonmetallic rear cover and a metallic bezel. The nonmetallic rear cover and the metallic bezel form a slot antenna. The nonmetallic rear cover has a plating layer used for enhancing antenna performance. The slot antenna can normally receive an external signal so as to implement a function of the smartwatch.

20 Claims, 1 Drawing Sheet

(56) References Cited

U.S. PATENT DOCUMENTS

| | | |
|---|---|---|
| 2013/0083491 A1 | 4/2013 | Rappoport et al. |
| 2014/0004302 A1 | 1/2014 | Miwa et al. |
| 2015/0261033 A1 | 9/2015 | Shin et al. |
| 2015/0370224 A1 | 12/2015 | Emmert et al. |
| 2015/0378321 A1 | 12/2015 | Fraser et al. |
| 2016/0170245 A1 | 6/2016 | Zhang et al. |
| 2016/0224066 A1 | 8/2016 | Hussa |
| 2016/0233573 A1 | 8/2016 | Son et al. |

FOREIGN PATENT DOCUMENTS

| | | | |
|---|---|---|---|
| CN | 104385757 A | 3/2015 | |
| CN | 104536288 A | 4/2015 | |
| CN | 104638361 A | 5/2015 | |
| CN | 104935686 A | 9/2015 | |
| CN | 204668449 U | 9/2015 | |
| CN | 105093908 A | 11/2015 | |
| CN | 105914465 A | 8/2016 | |
| CN | 205427450 U | 8/2016 | |
| CN | 205608406 U | 9/2016 | |
| CN | 106299678 A | 1/2017 | |
| CN | 106330246 A | 1/2017 | |
| CN | 205862123 U | 1/2017 | |
| JP | H07193416 A | 7/1995 | |
| JP | 2003318622 A | 11/2003 | |
| WO | WO-2004102738 A1 * | 11/2004 | ............ H01Q 1/243 |
| WO | 2007058230 A1 | 5/2007 | |
| WO | 2012108433 A1 | 8/2012 | |
| WO | 2016111727 A1 | 7/2016 | |

OTHER PUBLICATIONS

Machine Translation and Abstract of Chinese Publication No. CN104536288, Apr. 22, 2015, 8 pages.
Machine Translation and Abstract of Chinese Publication No. CN104638361, May 20, 2015, 13 pages.
Machine Translation and Abstract of Chinese Publication No. CN105093908, Nov. 25, 2015, 9 pages.
Machine Translation and Abstract of Chinese Publication No. CN105914465, Aug. 31, 2016, 22 pages.
Machine Translation and Abstract of Chinese Publication No. CN106299678, Jan. 4, 2017, 14 pages.
Machine Translation and Abstract of Chinese Publication No. CN204668449, Sep. 23, 2015, 12 pages.
Machine Translation and Abstract of Chinese Publication No. CN205608406, Sep. 28, 2016, 8 pages.
Machine Translation and Abstract of Chinese Publication No. CN205862123, Jan. 4, 2017, 7 pages.
Foreign Communication From a Counterpart Application, Chinese Application No. 201780073305.7, Chinese Office Action dated Nov. 25, 2019, 8 pages.
Foreign Communication From a Counterpart Application, PCT Application No. PCT/CN2017/087605, English Translation of International Search Report dated Nov. 6, 2017, 2 pages.
Foreign Communication From a Counterpart Application, PCT Application No. PCT/CN2017/087605, English Translation of Written Opinion dated Nov. 6, 2017, 4 pages.

* cited by examiner

WEARABLE DEVICE

CROSS-REFERENCE TO RELATED APPLICATIONS

This application is a National Stage of International Application No. PCT/CN2017/087605, filed on Jun. 8, 2017, which claims priority to Chinese Patent Application No. 201710084524.7, filed on Feb. 16, 2017. Both of the aforementioned applications are hereby incorporated by reference in their entireties.

TECHNICAL FIELD

This application relates to the communications field, and in particular, to a wearable device.

BACKGROUND

There are currently many kinds of wearable devices, such as smartwatches and smart bands. A smartwatch is used as an example. The smartwatch is provided with an antenna, through which an external signal is received to implement various functions of the smartwatch. FIG. 1 shows an antenna layout of a common smartwatch. An antenna in the smartwatch is usually a slot antenna. The slot antenna is implemented by using a slot between a metallic bezel and a metallic rear cover. As shown in FIG. 2, an antenna feeding point is located near a watch lug. In other words, for an existing smartwatch, design of a slot antenna is implemented in a housing by using a metallic bezel and a metallic rear cover.

SUMMARY

During research, it is found that, if a wearable device uses a metallic rear cover, comfortability of the wearable device is poor because metal is not skin-friendly. If a nonmetallic rear cover substitutes for the metallic rear cover for the purpose of comfortability, a slot antenna cannot be formed between a metallic bezel and the nonmetallic rear cover. This greatly degrades radio transmission performance of the wearable device.

This application provides a wearable device, so as to solve how comfortability and radio transmission performance are integrated in a wearable device.

To achieve the foregoing objective, this application provides the following technical solutions:

A first aspect of this application provides a wearable device, including a metallic bezel and a nonmetallic rear cover, where an inner surface of the nonmetallic rear cover has a plating layer, and the plating layer and the metallic bezel form a slot antenna. Compared with a metallic rear cover, the nonmetallic rear cover is more skin-friendly, and therefore is more comfortable to wear. In addition, because the nonmetallic rear cover has the plating layer that forms the slot antenna with the metallic bezel, the wearable device has normal radio transmission performance. In this way, user comfortability and radio transmission performance are integrated in the smartwatch.

In an implementation, the nonmetallic rear cover includes a ceramic rear cover. Compared with a metallic rear cover, the ceramic rear cover is more skin-friendly and more comfortable.

In an implementation, the nonmetallic rear cover includes a plastic rear cover or a glass rear cover.

A first aspect of this application provides a wearable device, including a nonmetallic housing, where the nonmetallic housing is a part, of the wearable device, that contacts a human body; and an inner surface of the nonmetallic rear cover has a plating layer, and the plating layer and a metallic housing of the wearable device form a slot antenna.

In an implementation, the nonmetallic housing includes a ceramic housing.

In an implementation, the nonmetallic housing includes a plastic housing or a glass housing.

In an implementation, a material of the plating layer includes a metallic or nonmetallic conductive material.

In an implementation, the material of the plating layer includes metallic silver. Because of low impedance of silver, metallic silver is added to the inner surface of the nonmetallic rear cover. The plating layer of metallic silver can ensure that the smartwatch has better radio performance.

DESCRIPTION OF EMBODIMENTS

Embodiments of this application provide a wearable device. The wearable device may be a smartwatch, a band, or the like. The following description uses the smartwatch as an example.

Figure 1:
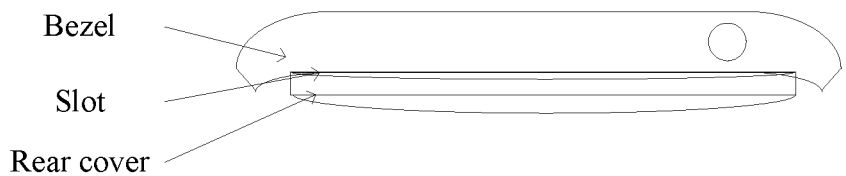
FIG. 1 is a schematic diagram of an antenna position of a smartwatch.
Figure 2:
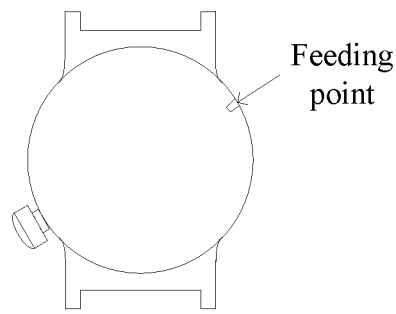
FIG. 2 is a schematic diagram of an antenna feeding point of a smartwatch.
Figure 3:
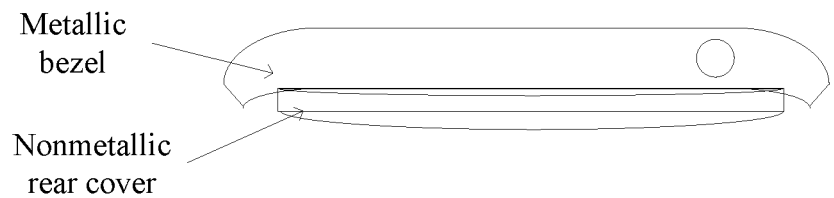
FIG. 3 is a schematic structural diagram of a smartwatch according to an embodiment of this application.

FIG. 3 is a schematic structural diagram of a smartwatch according to an embodiment of this application. The smartwatch includes a metallic bezel and a nonmetallic rear cover. An inner surface of the nonmetallic rear cover has a plating layer. The plating layer on the inner surface of the nonmetallic rear cover and the metallic bezel form a slot antenna.

Figure 4:
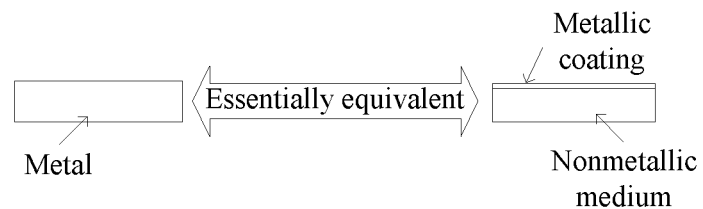
FIG. 4 is a schematic diagram of an antenna equivalence theory.

FIG. 4 shows a principle of forming a slot antenna by using a metallic plating layer and a metallic bezel. According to an antenna equivalence principle, a metallic layer is disposed on a surface of a nonmetallic medium, and the disposed metallic layer has an antenna effect essentially equivalent to that of a metal body. Therefore, in this embodiment of this application, the metallic plating layer is added to the inner surface of the nonmetallic rear cover. The metallic plating layer and the metallic bezel form the slot antenna, so that the nonmetallic rear cover with the metallic plating layer has an antenna effect essentially equivalent to that of a metallic rear cover. Further, the slot antenna formed by the nonmetallic rear cover with the metallic plating layer and the metallic bezel is equivalent to a slot antenna formed by a metallic rear cover and a metallic bezel.

In this embodiment of this application, the smartwatch uses the nonmetallic rear cover. Compared with a metallic rear cover, the nonmetallic rear cover is more skin-friendly, and therefore is more comfortable to wear. In addition, because the nonmetallic rear cover has the plating layer that forms the slot antenna with the metallic bezel, the wearable device has normal radio transmission performance. It can be learned that user comfortability and radio transmission performance are integrated in the smartwatch in this embodiment.

Optionally, a material of the plating layer is metallic silver. Due to low impedance of silver, metallic silver is added to the inner surface of the nonmetallic rear cover. The plating layer of metallic silver can ensure that the smartwatch has better radio performance. Certainly, the material of the plating layer may alternatively be copper, gold, or another metallic highly-conductive material, or may be a nonmetallic conductive material.

Optionally, the rear cover of the smartwatch shown in FIG. 3 may be ceramic. Compared with a metallic rear cover, a ceramic rear cover is more skin-friendly and more comfortable. In terms of industrial design effects, an all-plastic material chosen for the rear cover cheapens the smartwatch. From an aspect of human feeling, the metallic rear cover is neither skin-friendly nor comfortable. The ceramic rear cover overcomes defects of both the all-plastic rear cover and the metallic rear cover. Certainly, the material of the nonmetallic rear cover may alternatively be plastic, glass, or another nonmetallic material.

Experiments have proved that signal sending/receiving performance of a smartwatch with a ceramic rear cover whose inner surface has a metallic silver plating layer is essentially equivalent to signal sending/receiving performance of a smartwatch with a metallic bezel and a metallic rear cover.

Obviously, disposing the metallic silver plating layer on the inner surface of the ceramic rear cover of the smartwatch resolves a problem of degraded radio performance of a wearable device resulting from a combination of a nonmetallic rear cover and a metallic bezel. In addition, in the aspect of human feeling, skin-friendliness and comfortability are integrated in the wearable device.

Compared with a sheet of metal added to the inner surface of the nonmetallic rear cover, the metallic plating layer added to the inner surface of the nonmetallic rear cover can be attached evenly and reliably. In addition, the metallic plating layer can cover an entire inner wall of the rear cover. If the non-metallic rear cover is a curved surface, a better three-dimensional structure can be formed on the inner wall behind the plating layer, maintaining integrity of the industrial design of the smartwatch. Optionally, a shape of the plating layer may be designed depending on different industrial requirements.

For other non-smartwatch wearable devices, similarly, a housing of a nonmetallic material is used as a housing for contact with a human body, to improve comfortability of the wearable devices. For example, a housing, of a smart band, that contacts a human body is a ceramic housing. Moreover, to avoid degrading signal receiving performance of the device due to housing material substitution, a plating layer used for enhancing antenna performance may be disposed on an inner surface of the nonmetallic housing.

What is claimed is:

1. A wearable device, comprising:
   a metallic bezel; and
   a nonmetallic rear cover coupled to the metallic bezel and comprising an inner surface having a plating layer, wherein the plating layer and the metallic bezel form a slot antenna.

2. The wearable device of claim 1, wherein the nonmetallic rear cover comprises a ceramic rear cover.

3. The wearable device of claim 1, wherein the nonmetallic rear cover comprises a plastic rear cover.

4. The wearable device of claim 1, wherein a material of the plating layer comprises a metallic conductive material or a nonmetallic conductive material.

5. The wearable device of claim 1, wherein a material of the plating layer comprises metallic silver.

6. A wearable device, comprising:
   a housing comprising a metallic housing and a nonmetallic housing, wherein the nonmetallic housing has a plating layer, wherein the nonmetallic housing is configured to contact a human body, and wherein the plating layer and the metallic housing form a slot antenna;
   a touchscreen, wherein the touchscreen and the housing form a space; and
   one or more processors coupled to the touchscreen and the housing and disposed in the space.

7. The wearable device of claim 6, wherein the nonmetallic housing comprises a ceramic housing.

8. The wearable device of claim 6, wherein the nonmetallic housing comprises a plastic housing.

9. The wearable device of claim 6, wherein a material of the plating layer comprises a metallic conductive material or a nonmetallic conductive material.

10. The wearable device of claim 6, wherein a material of the plating layer comprises metallic silver.

11. The wearable device of claim 1, wherein the wearable device is a smart watch.

12. The wearable device of claim 6, wherein the wearable device is a smart watch.

13. A wearable device, comprising:
   a touchscreen;
   a metallic bezel;
   a nonmetallic rear cover comprising an inner surface having a plating layer, wherein the plating layer and the metallic bezel form a slot antenna, and wherein the touchscreen, the metallic bezel, and the nonmetallic rear cover form a space; and
   one or more processors coupled to the touchscreen, the metallic bezel, and the nonmetallic rear cover and disposed in the space.

14. The wearable device of claim 13, wherein the nonmetallic rear cover comprises a ceramic rear cover.

15. The wearable device of claim 14, wherein the nonmetallic rear cover comprises a plastic rear cover or a glass rear cover.

16. The wearable device of claim 13, wherein a material of the plating layer comprises a metallic conductive material or a nonmetallic conductive material.

17. The wearable device of claim 13, wherein a material of the plating layer comprises metallic silver.

18. The wearable device of claim 13, wherein the wearable device is a smart watch.

19. The wearable device of claim 1, wherein the nonmetallic rear cover comprises a-glass rear cover.

20. The wearable device of claim 6, wherein the nonmetallic housing comprises a glass housing.

* * * * *